(12) United States Patent
Okubo et al.

(10) Patent No.: US 11,557,773 B2
(45) Date of Patent: Jan. 17, 2023

(54) FUEL CELL METAL SEPARATOR AND POWER GENERATION CELL

(71) Applicant: HONDA MOTOR CO., LTD., Tokyo (JP)

(72) Inventors: Takuro Okubo, Wako (JP); Suguru Ohmori, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 93 days.

(21) Appl. No.: 17/197,504

(22) Filed: Mar. 10, 2021

(65) Prior Publication Data

US 2021/0288339 A1    Sep. 16, 2021

(30) Foreign Application Priority Data

Mar. 12, 2020   (JP) .............................. JP2020-042801

(51) Int. Cl.
*H01M 8/0276*   (2016.01)
*H01M 8/0258*   (2016.01)
*H01M 8/0206*   (2016.01)
*H01M 8/1004*   (2016.01)
*H01M 8/0267*   (2016.01)

(52) U.S. Cl.
CPC ....... *H01M 8/0276* (2013.01); *H01M 8/0206* (2013.01); *H01M 8/0258* (2013.01); *H01M 8/0267* (2013.01); *H01M 8/1004* (2013.01); *H01M 2250/20* (2013.01)

(58) Field of Classification Search
CPC ............. H01M 8/0206; H01M 8/0258; H01M 8/0267; H01M 8/1004; H01M 8/0276
See application file for complete search history.

(56) References Cited

U.S. PATENT DOCUMENTS

| 6,861,171 B1 * | 3/2005 | Suzuki ................ H01M 8/0273 429/510 |
| 2018/0114994 A1 | 4/2018 | Blakeley et al. |
| 2018/0226665 A1 * | 8/2018 | Oyama ............... H01M 8/1004 |

\* cited by examiner

*Primary Examiner* — Brittany L Raymond
(74) *Attorney, Agent, or Firm* — Carrier Shende & Associates, P.C.; Joseph P. Carrier; Jeffrey T. Gedeon (57) ABSTRACT

A first metal separator includes a seal bead protruding from a base plate. The seal bead includes a curved section having a curved shape in a plan view of the first metal separator. The combination of the radius of curvature and the angle of the curved section is set within a specific zone where variation in a seal surface pressure in a direction in which the seal bead extends is suppressed.

10 Claims, 5 Drawing Sheets

FUEL CELL METAL SEPARATOR AND POWER GENERATION CELL

CROSS-REFERENCE TO RELATED APPLICATION

This application is based upon and claims the benefit of priority from Japanese Patent Application No. 2020-042801 filed on Mar. 12, 2020, the contents of which are incorporated herein by reference.

BACKGROUND OF THE INVENTION

Field of the Invention

The present invention relates to a fuel cell metal separator and a power generation cell.

Description of the Related Art

For example, a solid polymer electrolyte fuel cell includes a membrane electrode assembly (MEA). The MEA includes an electrolyte membrane, an anode provided on one surface of the electrolyte membrane, and a cathode provided on the other surface of the electrolyte membrane. The electrolyte membrane is a polymer ion exchange membrane. The MEA is sandwiched between separators (bipolar plates) to form a power generation cell (unit of a fuel cell). A fuel cell stack includes a stack body formed by stacking a predetermined number of the power generation cells together. For example, the fuel cell stack is mounted in a fuel cell vehicle (fuel cell electric automobile, etc.).

In the fuel cell stack, as a separator, a metal separator may be used. The specification of U.S. Patent Application Publication No. 2018/0114994 discloses a ridge shaped seal bead formed integrally with a metal separator for preventing leakage of an oxygen-containing gas and a fuel gas as reactant gases, and a coolant. A tightening load is applied to a fuel cell stack in a stacking direction. The seal bead is elastically deformed to generate a surface pressure (seal surface pressure) at a top part of the seal bead, and the desired seal performance is exerted.

SUMMARY OF THE INVENTION

In the seal bead, the seal surface pressure in the curved section tends to be larger than the seal surface pressure in the straight section. In the case where variation in the seal surface pressure in the direction in which the seal bead extends is large, it is difficult to obtain the desired seal performance.

The present invention has been made taking such a problem into account, and an object of the present invention is to provide a fuel cell metal separator and a power generation cell in which it is possible to suppress variation in the seal surface pressure in a direction in which a seal bead extends.

According to a first aspect of the present invention, provided is a fuel cell metal separator, including a base plate, and a seal bead protruding from the base plate in a separator thickness direction, and extending in a surface direction of the base plate. The seal bead includes a curved section having a curved shape in a plan view of the fuel cell metal separator. A combination of a radius of curvature and an angle of the curved section is set within a specific zone where variation in a seal surface pressure in a direction in which the seal bead extends is suppressed.

According to a second aspect of the present invention, provided is a power generation cell including a membrane electrode assembly, and a metal separator stacked on the membrane electrode assembly. The metal separator includes a base plate, and a seal bead protruding from the base plate in a separator thickness direction, and extending along a surface of the base plate. The seal bead includes a curved section having a curved shape in a plan view of the metal separator. A combination of a radius of curvature and an angle of the curved section is set within a specific zone where variation in a seal surface pressure in a direction in which the seal bead extends is suppressed.

According to the above aspects, increase in the seal surface pressure of the curved section is suppressed. Accordingly, it is possible to suppress variation in the seal surface pressure in the direction in which the seal bead including the curved section extends.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

DESCRIPTION OF THE PREFERRED EMBODIMENTS

Hereinafter, a preferred embodiment of a fuel cell metal separator and a power generation cell according to the present invention will be described with reference to the accompanying drawings.

Figure 1:
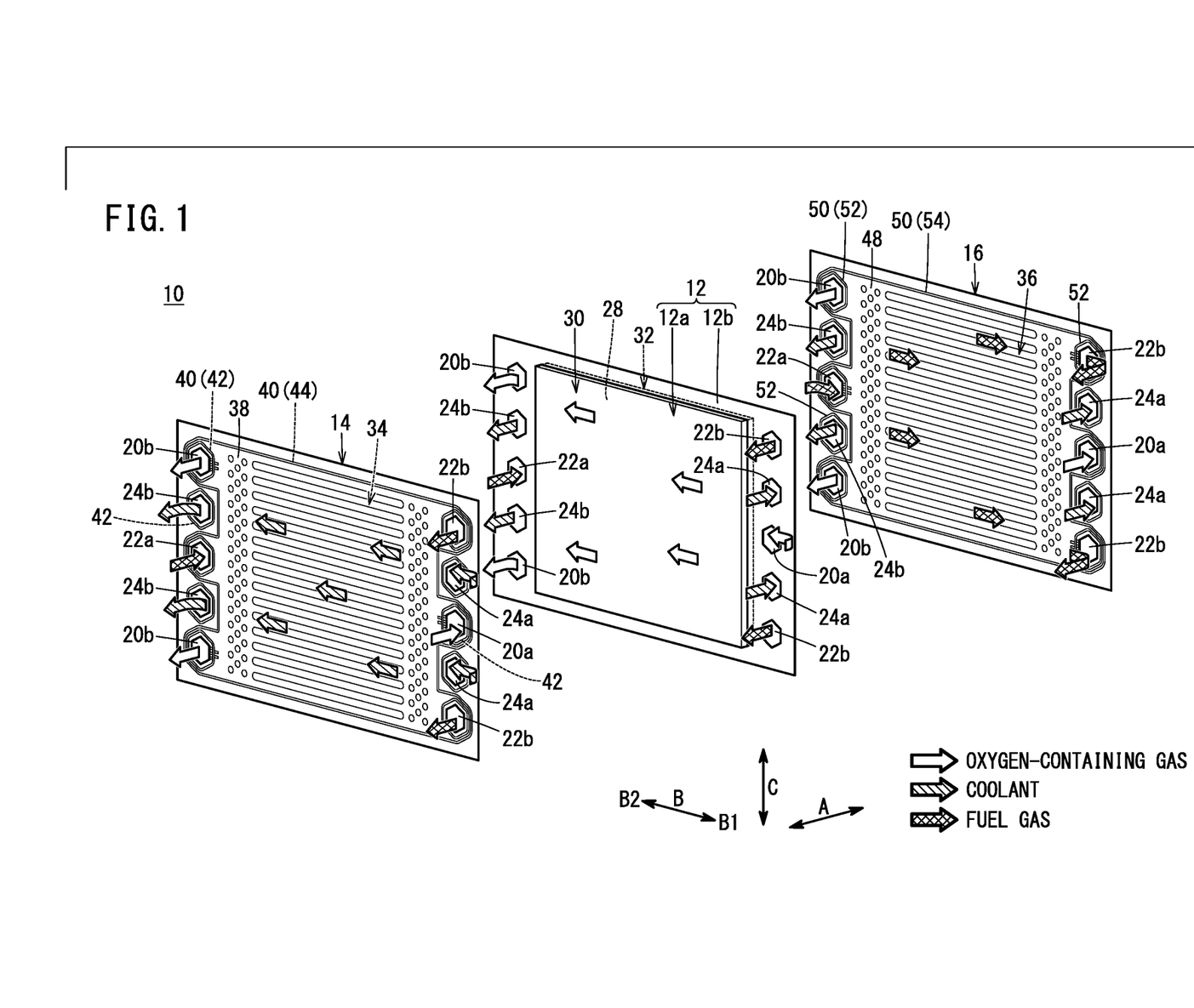
FIG. 1 is an exploded perspective view showing a power generation cell according to an embodiment of the present invention.

A power generation cell 10 forming a unit of a fuel cell shown in FIG. 1 includes a resin frame equipped MEA 12, a first metal separator 14 disposed on one surface of the resin frame equipped MEA 12, and a second metal separator 16 disposed on the other side of the resin frame equipped MEA 12. A plurality of power generation cells 10 are stacked together in a direction indicated by an arrow A (horizontal direction) or in a direction indicated by an arrow C (gravity direction). A tightening load (compression load) in the stacking direction is applied to the power generation cells 10 to form a fuel cell stack (not shown). For example, the fuel cell stack is mounted as an in-vehicle fuel cell stack in a fuel cell electric automobile (not shown).

Each of the first metal separator 14 and the second metal separator 16 is formed by press forming of a steel plate, a stainless steel plate, an aluminum plate, a plated steel plate, or a metal thin plate having an anti-corrosive surface by surface treatment to have a corrugated shape in cross section and a wavy shape on the surface. The first metal separator 14 of one of the adjacent power generation cells 10 and the second metal separator 16 of the other of the adjacent power generation cells 10 are joined together by welding, brazing, crimping, etc. integrally to form a joint separator.

At one end of the first metal separator 14, the second metal separator 16, and a resin frame member 12b described later each having a rectangular shape, in a longitudinal direction indicated by the arrow B (end in the direction indicated by the arrow B1), one oxygen-containing gas supply passage 20a for supplying an oxygen-containing gas, two fuel gas discharge passages 22b for discharging a fuel gas, and two coolant supply passages 24a for supplying a coolant are provided. The oxygen-containing gas supply passage 20a, the coolant supply passages 24a, and the fuel gas discharge passages 22b extend through each of the first metal separator 14, the second metal separator 16, and the resin frame member 12b in the cell thickness direction (direction indicated by the arrow A). The oxygen-containing gas supply passage 20a, the coolant supply passages 24a, and the fuel gas discharge passages 22b are arranged in the vertical direction (direction indicated by the arrow C).

For example, the oxygen-containing gas is the air. For example, the fuel gas is a hydrogen-containing gas. For example, the coolant is liquid containing water.

At the other end of the first metal separator 14, the second metal separator 16, and the resin frame member 12b in the longitudinal direction (end in the direction indicated by the arrow B2), two oxygen-containing gas discharge passages 20b for discharging the oxygen-containing gas, one fuel gas supply passage 22a for supplying the coolant, and two coolant discharge passages 24b for discharging the coolant are provided.

The fuel gas supply passage 22a, the coolant discharge passages 24b, and the oxygen-containing gas discharge passages 20b extend through each of the first metal separator 14, the second metal separator 16, and the resin frame member 12b in the cell thickness direction (direction indicate by the arrow A). The oxygen-containing gas discharge passages 20b, the fuel gas supply passage 22a, and the coolant discharge passages 24b are arranged vertically in the vertical direction.

Each of the fluid passages (the oxygen-containing gas supply passage 20a, the oxygen-containing gas discharge passages 20b, the fuel gas supply passage 22a, the fuel gas discharge passages 22b, the coolant supply passages 24a, and the coolant discharge passages 24b) has a hexagonal shape in a plan view. Each of the fluid passages may have another polygonal shape such as a triangular shape or a quadrangular shape, and may have a polytonal shape including curved corners.

The layout and the numbers of the oxygen-containing gas supply passage 20a, the oxygen-containing gas discharge passages 20b, the fuel gas supply passage 22a, the fuel gas discharge passages 22b, the coolant supply passage 24a, and the coolant discharge passages 24b are not limited to the embodiment of the present invention, and may be determined as necessary.

The resin frame equipped MEA 12 includes a membrane electrode assembly 12a (hereinafter referred to as the "MEA 12a", and the frame shaped resin frame member 12b provided on an outer peripheral portion of the MEA 12a. The resin frame equipped MEA 12 is a form of an MEA member having the MEA 12a. The MEA 12a includes an electrolyte membrane 28, a cathode 30 provided on one surface of the electrolyte membrane 28, and an anode 32 provided on the other surface of the electrolyte membrane 28.

For example, the electrolyte membrane 28 is a solid polymer electrolyte membrane (cation ion exchange membrane). For example, the sold polymer electrolyte membrane is a thin membrane of perfluorosulfonic acid containing water. The electrolyte membrane 28 is held between the cathode 30 and the anode 32. A fluorine based electrolyte may be used as the electrolyte membrane 28. Alternatively, an HC (hydrocarbon) based electrolyte may be used as the electrolyte membrane 28.

The resin frame member 12b is in the form of a film, and joined to an outer peripheral portion of the MEA 12a. Examples of the material of the resin frame member 12b include a general purpose plastics, engineering plastics, super engineering plastics, etc. having electrical insulation properties.

In should be noted that, the MEA member may adopt other forms. Instead of using the resin frame member 12b, the electrolyte membrane 28 may be configured to protrude outward. Further, frame shaped films may be provided on both sides of the electrolyte membrane 28 which protrudes outward.

Figure 2:
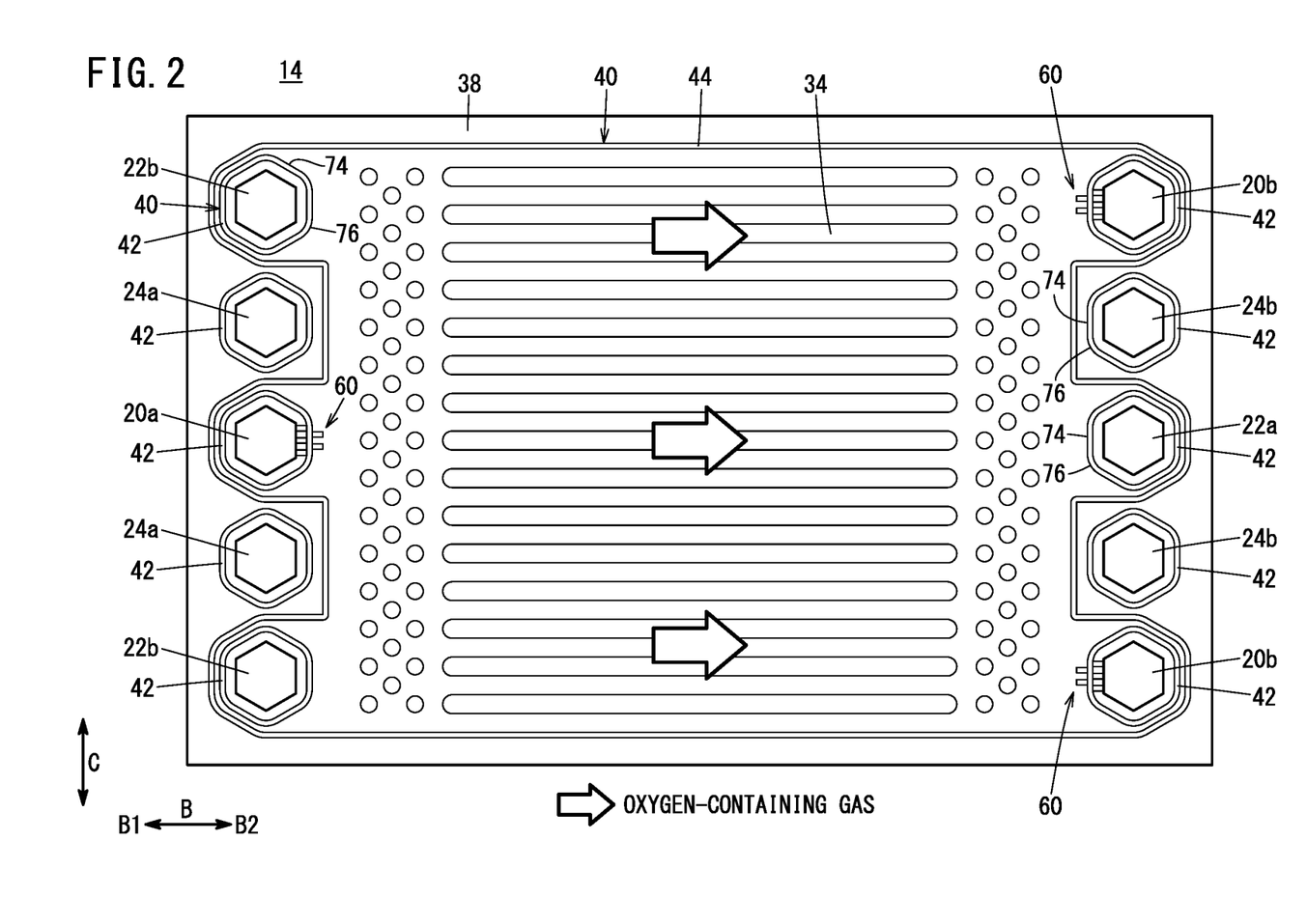
FIG. 2 is a plan view showing a first metal separator.

The first metal separator 14 has an oxygen-containing gas flow field 34 on its surface facing the resin frame equipped MEA 12 (specifically, the cathode 30). As shown in FIG. 2, for example, the oxygen-containing gas flow field 34 extends in the direction indicated by the arrow B. The oxygen-containing gas flow field 34 is connected to (in fluid communication with) the oxygen-containing gas supply passage 20a and the oxygen-containing gas discharge passages 20b.

The first metal separator 14 includes a flat plate shaped base plate 38, and a seal bead 40 protruding from the base plate 38 toward the outer peripheral portion of the MEA member (in the embodiment of the present invention, the resin frame member 12b). The seal bread 40 is formed integrally with the first metal separator 14 by press forming. In the structure, the root of the seal bead 40 is connected to the base plate 38 integrally.

The first metal separator 14 includes a plurality of forms of seal beads 40. The seal beads 40 protrude from the base plate 38 in the separator thickness direction (thickness direction of the base plate 38), and extends in the surface direction of the base plate 38. The back surface of each of the seal beads 40 (the surface opposite to the protruding surface) has a recessed shape. Each of the seal beads 40 has a trapezoidal shape in cross section. Each of the seal beads 40 may have a rectangular shape in cross section. Rubber material (rubber seal) may be fixed to a top part (protruding front end surface) of each of the seal beads 40 by printing or coating.

As the plurality of forms of seal beads 40, the first metal separator 14 includes a plurality of passage beads 42 and an outer bead 44. The plurality of passage beads 42 surround the fluid passages (the oxygen-containing gas supply passage 20a, the oxygen-containing gas discharge passages 20b, the fuel gas supply passage 22a, the fuel gas discharge passages 22b, the coolant supply passages 24a, and the coolant discharge passages 24b), respectively.

The outer bead 44 is provided in the outer peripheral portion of the first metal separator 14, and surrounds the oxygen-containing gas flow field 34. The passage beads 42 surrounding the oxygen-containing gas supply passage 20a, the oxygen-containing gas discharge passages 20b, the fuel gas supply passage 22a, and the fuel gas discharge passages 22b, respectively, are provided inside the outer bead 44 in a plan view.

Figure 4:
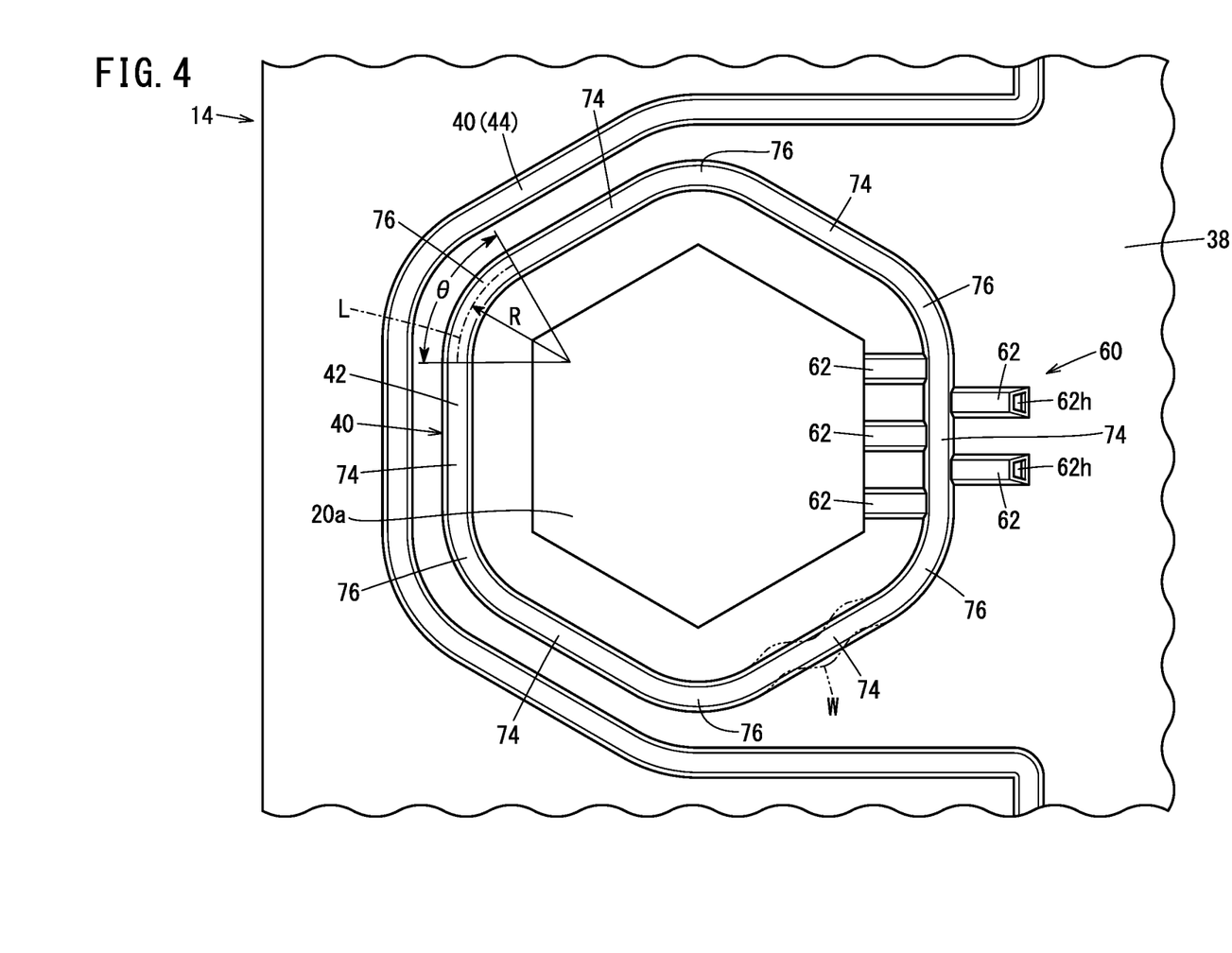
FIG. 4 is a view showing a passage bead and an area around the passage bead.

As shown in FIG. 4, the passage bead 42 surrounding the oxygen-containing gas supply passage 20a is provided with a bridge section 60 as a passage of the oxygen-containing gas. The bridge section 60 is formed by a plurality of tunnels 62 which protrude from the inner peripheral portion and the outer peripheral portion of the passage bead 42 surrounding the oxygen-containing gas supply passage 20a, respectively, and protrude from the base plate 38 toward the resin frame member 12b (see FIG. 1). The protruding length of each of the tunnels 62 from the base plate 38 is lower than the protruding height of the passage bead 42.

Each of the protruding ends of the tunnels 62 extending from the inner peripheral portion of the passage bead 42 is opened to the oxygen-containing gas supply passage 20a. A hole 62h is formed in each of the protruding ends of the tunnels 62 extending from the outer peripheral portion of the passage bead 42. The bridge section 60 connects oxygen-containing gas supply passage 20a and the oxygen-containing gas flow field 34 (see FIG. 2) through the inner space (back side recess) of the passage bead 42. Likewise, as shown in FIG. 2, the bridge section 60 is provided in the inner peripheral portion and the outer peripheral portion of the passage bead 42 surrounding each of the oxygen-containing gas discharge passages 20b.

As shown in FIG. 1, the second metal separator 16 has a fuel gas flow field 36 on its surface facing the resin frame equipped MEA 12 (specifically, the anode 32). For example, the fuel gas flow field 36 extends in the direction indicated by the arrow B. The fuel gas flow field 36 is connected to (in fluid communication with) the fuel gas supply passage 22a and the fuel gas discharge passages 22b.

Figure 3:
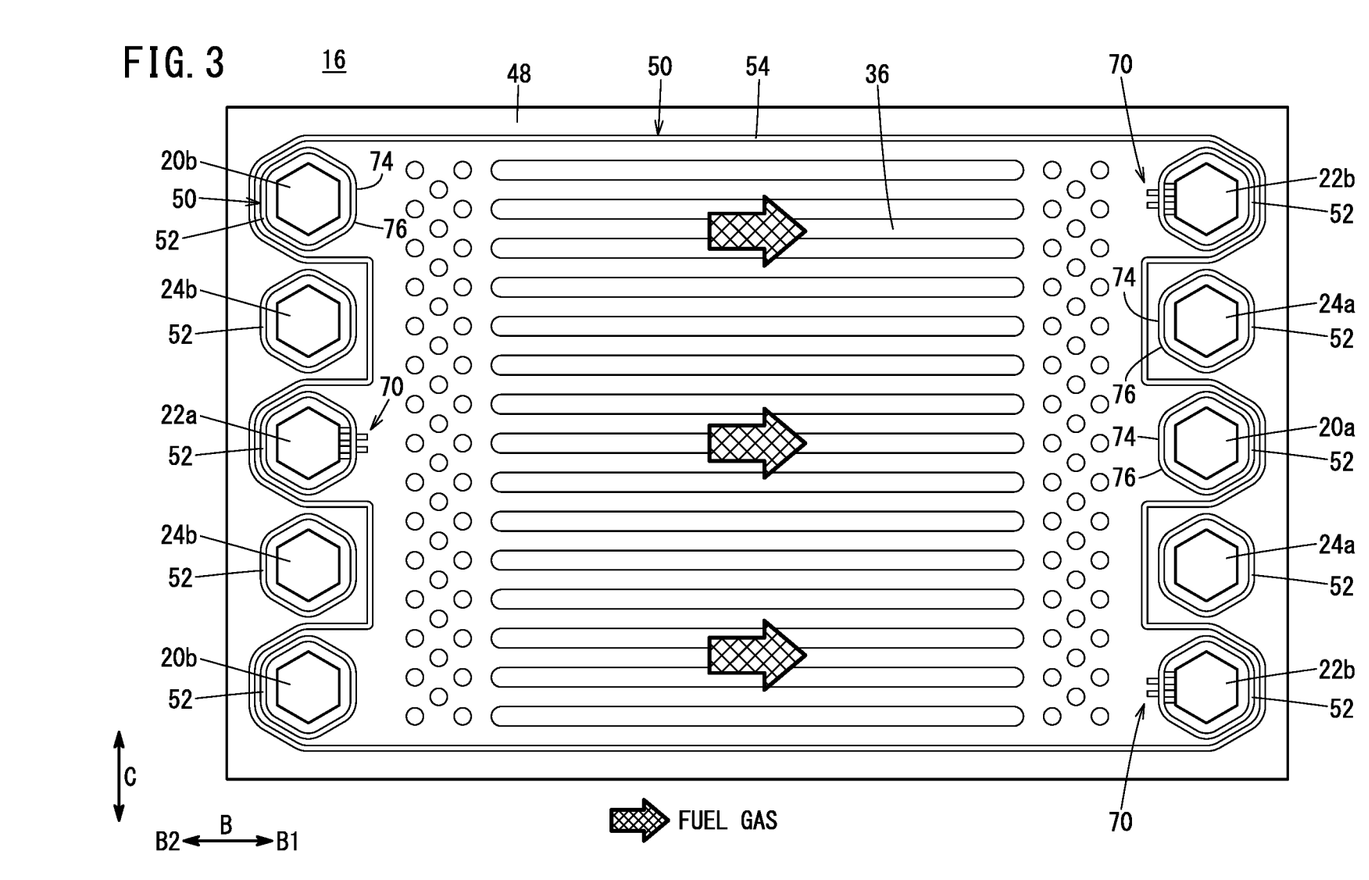
FIG. 3 is a plan view showing a second metal separator.

As shown in FIG. 3, the second metal separator 16 includes a flat plate shaped base plate 48, and a seal bead 50 protruding from the base plate 48 toward the outer peripheral portion (resin frame member 12b in the embodiment) of the MEA member. The seal bead 50 is formed integrally with the second metal separator 16 by press forming. Therefore, the root of the seal bead 50 is connected to the base plate 48 integrally.

The second metal separator 16 includes a plurality of forms of seal beads 50. The seal beads 50 protrude from the base plate 48 in the separator thickness direction (thickness direction of the base plate 38), and extends in the surface direction of the base plate 48. The back surface of each of the seal beads 50 (the shape opposite to the protruding side) has a recessed shape. Each of the seal beads 50 has a trapezoidal shape in cross section. Each of the seal beads 50 may have a rectangular shape in cross section. Rubber material (rubber seal) may be fixed to a top part (protruding front end surface) of each of the seal beads 50 by printing or coating.

As the plurality of forms of seal beads 50, the second metal separator 16 includes a plurality of passage beads 52 and an outer bead 54, as shown in FIG. 3. A plurality of passage beads 52 surround the plurality of fluid passages (the oxygen-containing gas supply passage 20a, the oxygen-containing gas discharge passages 20b, the fuel gas supply passage 22a, the fuel gas discharge passages 22b, the coolant supply passages 24a, and the coolant discharge passages 24b), respectively.

The outer bead 54 is provided in the outer peripheral portion of the second metal separator 16, and surrounds the fuel gas flow field 36. The passage beads 52 surrounding the oxygen-containing gas supply passage 20a, the oxygen-containing gas discharge passages 20b, the fuel gas supply passage 22a, the fuel gas discharge passages 22b, respectively, are provided inside the outer bead 54 in a plan view.

Each of the passage beads surrounding the fuel gas supply passage 22a and the fuel gas discharge passages 22b, respectively, is provided with a bridge section 70 as a passage of the fuel gas, as in the case of the above-described bridge section 60 (FIG. 2) of the first metal separator 14.

As shown in FIG. 2, the passage bead 42 of the first metal separator 14 has a polygonal shape in a plan view (hexagonal shape in the embodiment of the present invention). The passage bead 42 may have other polygonal shapes (triangular shape, quadrangular shape).

As shown in FIG. 4, the passage bead 42 includes a plurality of straight sections 74 formed along a straight line, and a plurality of curved sections 76 curved to have a circular arc shape, in a plan view of the first metal separator 14. The straight sections 74 and the curved sections 76 are disposed alternately, whereby the passage bead 42 has a polygonal shape as a whole. Therefore, the straight sections 74 correspond to the sides of the polygonal shape, and the curved sections 76 correspond to the corners of the polygonal shape.

It should be noted that, in a broad sense, the "straight section 74" is not limited to the perfectly straight shape, and includes a wavy shape W extending along a straight line. Therefore, the straight section 74 may have the wavy shape W having a small amplitude as indicated by a virtual line in FIG. 4. Stated otherwise, portions of the passage bead 42 corresponding to the sides of the polygonal shape may have a wavy shape W.

As shown in FIG. 2, the passage bead 42 which surrounds the fluid passages other than the oxygen-containing gas supply passage 20a, such as oxygen-containing gas discharge passages 20b, includes the plurality of straight sections 74 and the plurality of curved sections 76.

As shown in FIG. 4, the curved section 76 has a radius of curvature R and an angle θ. The radius of curvature R of the curved section 76 is a radius of curvature of a circular arc shaped curved line L passing through the center of the curved section 76 in the bead width direction. The angle θ of the curved section 76 is an angle between both ends of the curved section 76, i.e., an angle between the adjacent straight sections 74 on both sides of the curved section 76.

In general, in the seal bead, since the rigidity of the curved section is higher than the rigidity of the straight section due to the shape factor, the seal surface pressure in the curved section tends to be higher than the seal surface pressure in the straight section. As the angle θ becomes large and the radius of curvature R becomes small, the seal surface pressure becomes large. In view of this point, in the embodiment of the present invention, in the passage bead 42 which is one form of the seal bead 40, the radius of curvature R is set to be a certain value or greater with respect to the angle θ of the curved section 76 (the radius of curvature is set to be within a specific zone Z described below), to suppress increase in the seal surface pressure of the curved section 76. In this manner, variation of the seal surface pressure in a direction in which the passage bead 42 extends is suppressed.

Figure 5:
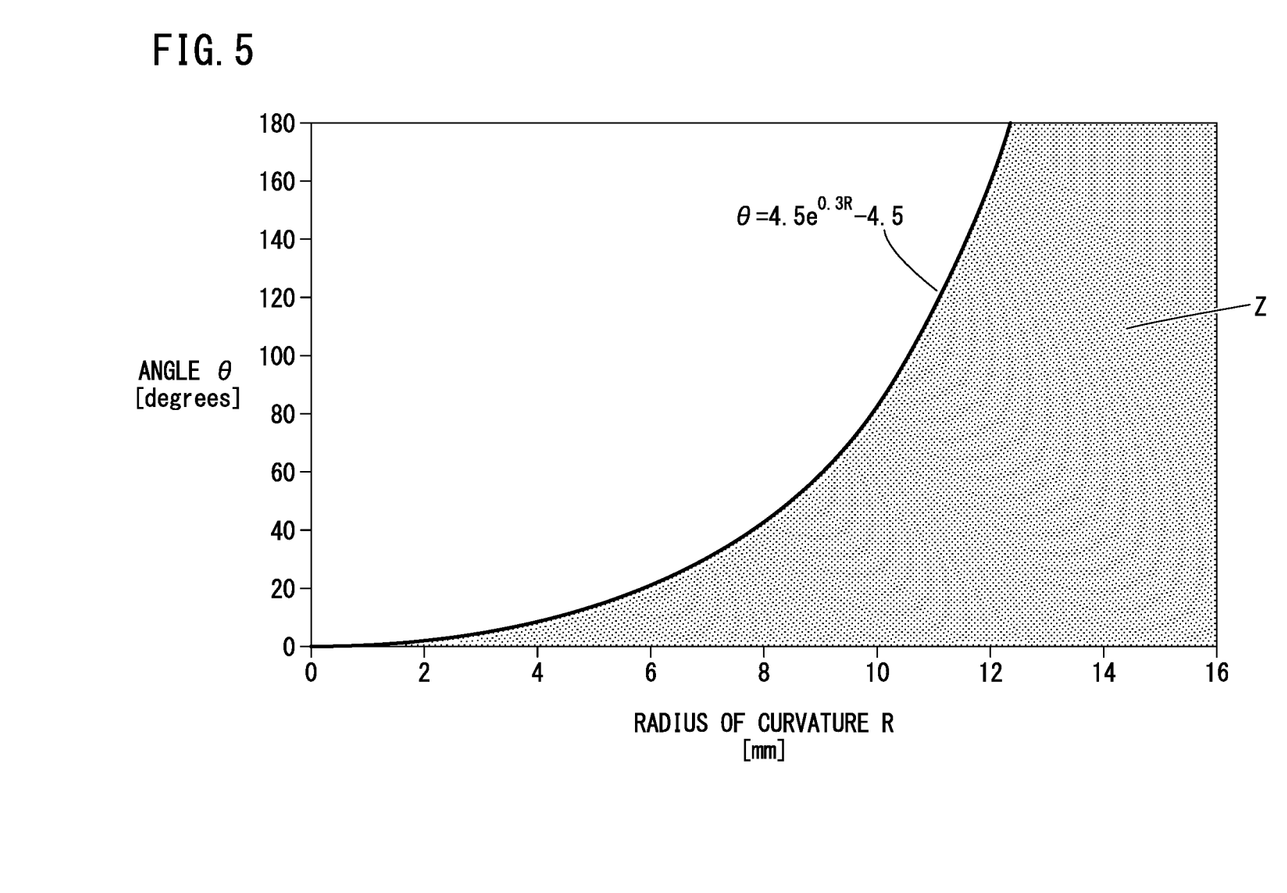
FIG. 5 is a graph showing a specific zone based on a combination of a radius of curvature and an angle of the passage bead shown in FIG. 4.

As shown in FIG. 5, the combination of the radius of curvature R and the angle θ of the curved section 76 is set to be within the specific zone Z where variation of the seal surface pressure in the direction in which the passage bead 42 extends is suppressed. Specifically, the combination of the radius of curvature R and the angle θ of the curved section 76 is set to satisfy the relational formula of $\theta \leq 4.5e^{0.3R} - 4.5$.

$\theta = 4.5e^{0.3R} - 4.5$ in FIG. 5 indicates a line (isobaric line) where the same seal surface pressure is generated for the radius of curvature R and the angle θ. The specific zone Z is a zone not more than the line of $\theta = 4.5e^{0.3R} - 4.5$. As a result of finite element analysis (FEA), it was confirmed that, by setting the radius of curvature R and the angle θ within the specific zone Z, the increase in the seal surface pressure of the curved section 76 can be suppressed and variation in the seal surface pressure can be kept within the desired range. On the other hand, in the zone above the line of θ=4.5e$^{0.3R}$−4.5, it was confirmed that the seal surface pressure of the curved section 76 was too high.

Within the specific zone Z described above, the angle θ of the curved section 76 is set to, for example, 60° to 120°, and the radius of curvature R is set to, for example, about 8.9 mm to 11.1 mm. The respective thicknesses of the first metal separator 14 and the second metal separator 16 are set to, e.g., 50 μm to 200 μm.

In FIG. 4, the radius of curvature R and angle θ are set within the above specific zone Z for the other curved sections 76, which are not marked with the signs of radius of curvature R and the angle θ, in the passage bead 42 surrounding the oxygen-containing gas supply passage 20a. The plurality of curved sections 76 provided for the same passage bead 42 may have the same combination or different combinations of the radius of curvature R and angle θ.

In FIG. 4, the passage bead 42 surrounding the oxygen-containing gas supply passage 20a is shown. Also in the case of the passage beads 42 surrounding the other fluid passages shown in FIG. 2 (the oxygen-containing gas discharge passages 20b, the fuel gas supply passage 22a, the fuel gas discharge passages 22b, the coolant supply passages 24a, and the coolant discharge passages 24b), the radius of curvature R and the angle θ are also set within the specific zone Z described above.

In FIG. 3, each of the passage beads 52 provided in the second metal separator 16 has the curved section 76 as well. In the curved section 76 of the passage bead 52, the radius of curvature R and the angle θ are set within the specific zone Z.

In the curved section of the outer beads 44, 54 which are other forms of the seal beads 40, 50 shown in FIG. 2 or FIG. 3, the combination of the radius of curvature R and the angle θ may be set within the specific zone Z.

The power generation cell 10 having the above structure shown in FIG. 1 is operated as follows.

An oxygen-containing gas is supplied to the oxygen-containing gas supply passage 20a, a fuel gas is supplied to the fuel gas supply passage 22a, and a coolant is supplied to the coolant supply passages 24a. The oxygen-containing gas supplied to the oxygen-containing gas supply passage 20a flows into the oxygen-containing gas flow field 34 of the first metal separator 14, and flows along the cathode 30. The fuel gas supplied to the fuel gas supply passage 22a flows into the fuel gas flow field 36 of the second metal separator 16, and flows along the anode 32.

Thus, in the membrane electrode assembly 12a, the oxygen-containing gas supplied to the cathode 30 and the fuel gas supplied to the anode 32 are partially consumed in electrochemical reactions in the electrode catalyst layers to perform power generation. The remaining gas which has not been consumed in the electrochemical reactions is discharged into the fuel gas discharge passage 22b, and the remaining oxygen-containing gas is discharged into the oxygen-containing gas discharge passage 20b.

In the meanwhile, the coolant supplied to the coolant supply passage 24a flows through the coolant flow field. After the coolant flows through the membrane electrode assembly 12a, the coolant is discharged from the coolant discharge passages 24b.

In the embodiment of the present invention, the following advantages are obtained.

As shown in FIGS. 4 and 5, the combination of the radius of curvature R and the angle θ of the curved section 76 of the seal bead 40 is set within the specific zone Z where variation in the seal surface pressure in the direction in which the seal bead 40 extends is suppressed. The combination of the radius of curvature R and the angle θ of the curved section 76 is set within the above specific zone Z. Therefore, the radius of curvature R relative to the angle θ becomes large. Thus, increase in the rigidity due to the curved shape of the curved section 76 is suppressed, and consequently, increase in the seal surface pressure of the curved section 76 is suppressed. Therefore, it is possible to suppress variation in the seal surface pressure in the direction in which the seal bead 40 including the curved section 76 extends.

The combination of the radius of curvature R and the angle θ of the curved section 76 satisfies the relational formula of θ≤4.5e$^{0.3R}$−4.5. Accordingly, it is possible to effectively suppress variation in the seal surface pressure in the direction in which the seal bead 40 including the curved section 76 extends.

The seal bead 40 where the combination of the radius of curvature R and the angle θ of the curved section 76 is set within the specific zone Z comprises the passage bead 42. For example, since the passage bead 42 is formed to be smaller than the outer bead 44, the radius of curvature R of the curved section 76 tends to be small. By setting the combination of the radius of curvature R and the angle θ of the curved section 76 of the passage bead 42 within the specific zone Z, it is possible to effectively suppress variation in the seal surface pressure in the direction in which the passage bead 42 extends.

The advantages of the curved section 76 of the seal bead 40 provided on the first metal separator 14 have been described above. The curved section 76 of the seal bead 50 provided on the second metal separator 16 has the same advantages as those described above.

The above embodiment can be summarized as follows:

The above embodiment discloses the fuel cell metal separator. The fuel cell metal separator includes the base plate (38), and the seal bead (40) protruding from the base plate in a separator thickness direction, and extending in a surface direction of the base plate. The seal bead includes the curved section (76) having a curved shape in a plan view of the fuel cell metal separator. The combination of the radius of curvature (R) and the angle (θ) of the curved section is set within the specific zone (Z) where variation in a seal surface pressure in a direction in which the seal bead extends is suppressed.

The above embodiment discloses the power generation cell (10). The power generation cell includes the membrane electrode assembly (12a), and the metal separator stacked on the membrane electrode assembly. The metal separator includes the base plate (38), and the seal bead (40) protruding from the base plate in a separator thickness direction, and extending along a surface of the base plate. The seal bead includes the curved section (76) having a curved shape in a plan view of the metal separator. The combination of the radius of curvature (R) and the angle (θ) of the curved section is set within the specific zone (Z) where variation in a seal surface pressure in a direction in which the seal bead extends is suppressed.

Where R denotes the radius of curvature, and θ denotes the angle of the curved section, a relational formula of θ≤4.5e$^{0.3R}$−4.5 is satisfied.

The fuel cell metal separator includes a fluid passage for allowing a reactant gas or a coolant to flow in the separator thickness direction, and the seal bead, for which the combination of the radius of curvature and the angle of the curved section is set within the specific zone, comprises the passage bead (42) surrounding the fluid passage.

A portion of the passage bead other than the curved section has a wavy shape (W) in the plan view.

The fuel cell system according to the present invention is not limited to the above-described embodiment. It is a matter of course that various structures may be adopted without departing from the gist of the present invention.

What is claimed is:

1. A fuel cell metal separator comprising:
a base plate; and
a seal bead protruding from the base plate in a separator thickness direction, and extending in a surface direction of the base plate,
wherein the seal bead includes a curved section having a curved shape in a plan view of the fuel cell metal separator,
a combination of a radius of curvature and an angle of the curved section in the plan view of the fuel cell metal separator is set within a specific zone where variation in a seal surface pressure in a circumferential direction of the seal bead having a closed shape is suppressed, and
where R denotes the radius of curvature, and $\theta$ denotes the angle of the curved section, a relational formula of $\theta \leq 4.5e^{0.3R} - 4.5$ is satisfied.

2. The fuel cell metal separator according to claim 1, wherein
the fuel cell metal separator includes a fluid passage configured to allow a reactant gas or a coolant to flow in the separator thickness direction, and
the seal bead, for which the combination of the radius of curvature and the angle of the curved section is set within the specific zone, comprises a passage bead surrounding the fluid passage.

3. The fuel cell metal separator according to claim 2, wherein a portion of the passage bead other than the curved section has a wavy shape in the plan view.

4. The fuel cell metal separator according to claim 1, wherein
the seal bead has a polygonal shape in the plan view, and
the curved section is provided in a portion corresponding to at least one of corners of the polygonal shape of the seal bead.

5. The fuel cell metal separator according to claim 1, wherein the seal bead has a polygonal shape in the plan view, and the curved section is provided in a portion corresponding to each of corners of the polygonal shape of the seal bead.

6. A power generation cell comprising:
a membrane electrode assembly; and
a metal separator stacked on the membrane electrode assembly,
the metal separator comprising:
a base plate; and
a seal bead protruding from the base plate in a separator thickness direction, and extending along a surface of the base plate,
wherein the seal bead includes a curved section having a curved shape in a plan view of the metal separator,
a combination of a radius of curvature and an angle of the curved section in the plan view of the fuel cell metal separator is set within a specific zone where variation in a seal surface pressure in a circumferential direction of the seal bead having a closed shape is suppressed, and
where R denotes the radius of curvature, and $\theta$ denotes the angle of the curved section, a relational formula of $\theta \leq 4.5e^{0.3R} - 4.5$ is satisfied.

7. The power generation cell according to claim 6, wherein
the metal separator includes a fluid passage configured to allow a reactant gas or a coolant to flow in the separator thickness direction, and
the seal bead, for which the combination of the radius of curvature and the angle of the curved section is set within the specific zone, comprises a passage bead surrounding the fluid passage.

8. The power generation cell according to claim 7, wherein a portion of the passage bead other than the curved section has a wavy shape in the plan view.

9. The power generation cell according to claim 6, wherein
the seal bead has a polygonal shape in the plan view, and
the curved section is provided in a portion corresponding to at least one of corners of the polygonal shape of the seal bead.

10. The power generation cell according to claim 6, wherein
the seal bead has a polygonal shape in the plan view, and
the curved section is provided in a portion corresponding to each of corners of the polygonal shape of the seal bead.

* * * * *